United States Patent
Koo

(10) Patent No.: US 7,897,039 B2
(45) Date of Patent: Mar. 1, 2011

(54) APPARATUS FOR COLLECTING CONDENSED WATER OF AIR CONDITIONER EVAPORATOR IN HEAVY CONSTRUCTION EQUIPMENT

(75) Inventor: Chang Hoe Koo, Kyungsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 660 days.

(21) Appl. No.: 11/825,634

(22) Filed: Jul. 6, 2007

(65) Prior Publication Data

US 2008/0017571 A1 Jan. 24, 2008

(30) Foreign Application Priority Data

Jul. 18, 2006 (KR) ...................... 10-2006-0066927

(51) Int. Cl.
*B01D 36/02* (2006.01)
(52) U.S. Cl. ...................... 210/99; 210/249; 210/257.1; 210/262; 210/418; 210/502.1
(58) Field of Classification Search ................ 210/171, 210/172.1, 175, 182, 249, 262, 266, 282, 210/287, 99, 257.1, 418, 502.1; 62/291
See application file for complete search history.

(56) References Cited

U.S. PATENT DOCUMENTS

| | | | |
|---|---|---|---|
| 4,547,289 A * | 10/1985 | Okano et al. ................ 210/652 |
| 5,928,506 A * | 7/1999 | Bae ............................. 210/94 |
| 6,899,809 B2 * | 5/2005 | Scharstuhl et al. ....... 210/257.2 |
| 2005/0126199 A1 * | 6/2005 | Akkad .......................... 62/291 |
| 2006/0000763 A1 * | 1/2006 | Rinker et al. ................ 210/282 |

* cited by examiner

*Primary Examiner*—Matthew O Savage
(74) *Attorney, Agent, or Firm*—Ladas & Parry

(57) ABSTRACT

An apparatus for collecting condensed water of an air conditioner evaporator in heavy construction equipment is disclosed, which is able to receive condensed water into a receiver from an evaporator and treats the same which comprises a body which is installed at one side of the evaporator and includes a plurality of support frames provided in the interior of the same, with its upper and lower sides being fixed with a vibration resistant member; a water collection pipe which allows the condensed water produced from the evaporator to be supplied to a water inlet valve; a storing tank which is connected with the water inlet valve and stores condensed water inputted via the water inlet valve; a water purification filter which filters dirt, heavy metallic substances and organic chemicals contained in the condensed water supplied from the storing tank; and a water purification tank which stores the filtered condensed water and has a pipe extended to the outside of the body.

4 Claims, 5 Drawing Sheets

US 7,897,039 B2

APPARATUS FOR COLLECTING CONDENSED WATER OF AIR CONDITIONER EVAPORATOR IN HEAVY CONSTRUCTION EQUIPMENT

CROSS-REFERENCE TO RELATED APPLICATION

This application is based on and claims priority from Korean Patent Application No. 10-2006-0066927, filed on Jul. 18, 2006 in the Korean Intellectual Property Office, the disclosure of which is incorporated herein in its entirety by reference.

BACKGROUND OF THE INVENTION

1. Field of the Invention

The present invention relates to an apparatus for collecting condensed water of an air conditioner evaporator in heavy construction equipment, and in particular to an apparatus for collecting condensed water of an air conditioner evaporator in heavy construction equipment which is able to collect and purify condensed water produced from an air conditioner evaporator for thereby using the same for a certain purpose such as washing hands.

2. Description of the Background Art

Generally, an air conditioner system of heavy construction equipment such as an excavator or a large size truck comprises a compressor for compressing refrigerant at a high temperature and a high pressure, a condenser for condensing the high temperature and pressure refrigerant, a receiver tank, a drier and an evaporator for evaporating refrigerant and inputting into an indoor space.

In the above conventional air conditioner system, the evaporator is provided at a front side of the condenser or at a side portion of the same for evaporating refrigerant which was compressed by the compressor. With the above operation, cool air is generated and supplied to a driver's cab as a high temperature and pressure refrigerant is compressed by the compressor and is condensed by the condenser.

In the course of operation of an air conditioner, as the evaporator 8 performs a heat exchange in the indoor, vapor contained in the air is condensed, and the condensed water is produced near the evaporator. The produced condensed water is discharged to the outside.

FIG. 1 is a schematic view illustrating a discharging state of condensed water of an air conditioner evaporator in conventional heavy construction equipment.

A shown therein, hot air "A" heated as a blowing fan 1 operates is cooled via an evaporator 2 and is discharged along a supply path.

Here, condensed water is produced at a power side of the evaporator 2. The condensed water "W" is received in a receiver 3 and is discharged to the outside.

A certain hose (not shown) may be provided at an outlet of the receiver 3 for preventing equipment from being polluted by the condensed water "W" or basically preventing pollution as dirt is stuck.

Since the condensed water "W" contains micro dirt or oily components owing to an outdoor operation of the heavy construction equipment, the condensed water "W" produced from the evaporator 2 is directly discharged to the outside in the conventional art. Namely, it is not used for a certain purpose.

When a certain work is performed at a place such as a hill or an open land area where there is not a drinkable water facility, it is needed to provide a water receptacle or a certain water supply facility so that workers can drink water or for washing equipment.

In the conventional art, there is not a certain element or means for receiving condensed water of an air conditioner evaporator of heavy construction equipment and recycling the same. Namely, the condensed water is directly discharged to the outside, not being used for a certain purpose.

Since the condensed water contains a lot of dirt owing to a worse work environment and foreign substances such as dirt and oily components. The conventional heavy construction equipment is not equipped with a certain water receiving device or a water process device since the heavy construction equipment has a lot of vibrations in the course of work.

SUMMARY OF THE INVENTION

Accordingly, it is an object of the present invention to provide an apparatus for collecting condensed water of an air conditioner evaporator in heavy construction equipment which is able to collect condensed water from an air conditioner evaporator and is able to use for a purpose of drinking or washing.

It is another object of the present invention to provide an apparatus for collecting condensed water of an air conditioner evaporator in heavy construction equipment which is able to filter dirt or oily foreign substances and is able to absorb vibrations for thereby implementing an efficient water collection and treatment of condensed water.

To achieve the above objects, there is provided an apparatus for collecting condensed water of an air conditioner evaporator in heavy construction equipment which is able to receive condensed water into a receiver from an evaporator and treats the same which comprises a body which is installed at one side of the evaporator and includes a plurality of support frames provided in the interior of the same, with its upper and lower sides being fixed with a vibration resistant member; a water collection pipe which allows the condensed water produced from the evaporator to be supplied to a water inlet valve; a storing tank which is connected with the water inlet valve and stores condensed water inputted via the water inlet valve; a water purification filter which filters dirt, heavy metallic substances and organic chemicals contained in the condensed water supplied from the storing tank; and a water purification tank which stores the filtered condensed water and has a pipe extended to the outside of the body.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The construction of an apparatus for collecting condensed water of an air conditioner evaporator in heavy construction equipment according to the present invention will be described with reference to the accompanying drawings.

Figure 1:
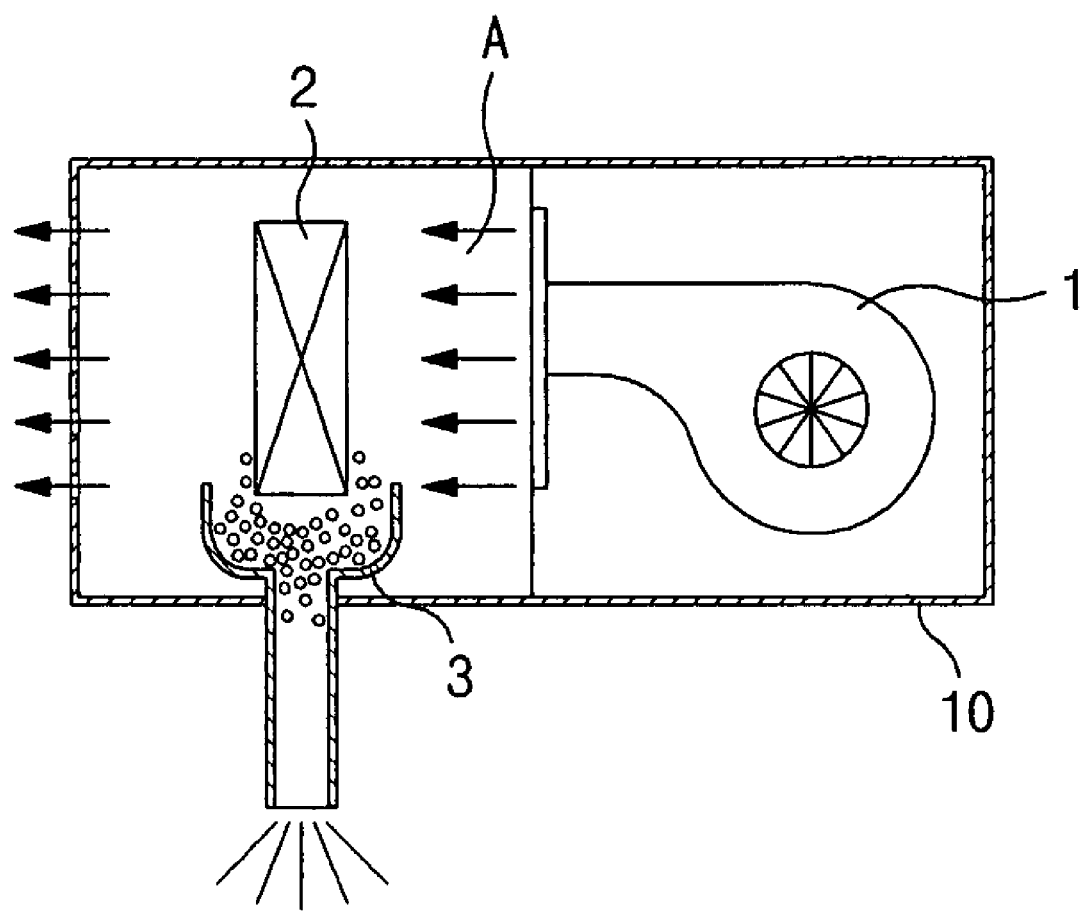
FIG. 1 is a schematic view illustrating a discharging state of condensed water of an air conditioner evaporator in conventional heavy construction equipment.
Figure 2:
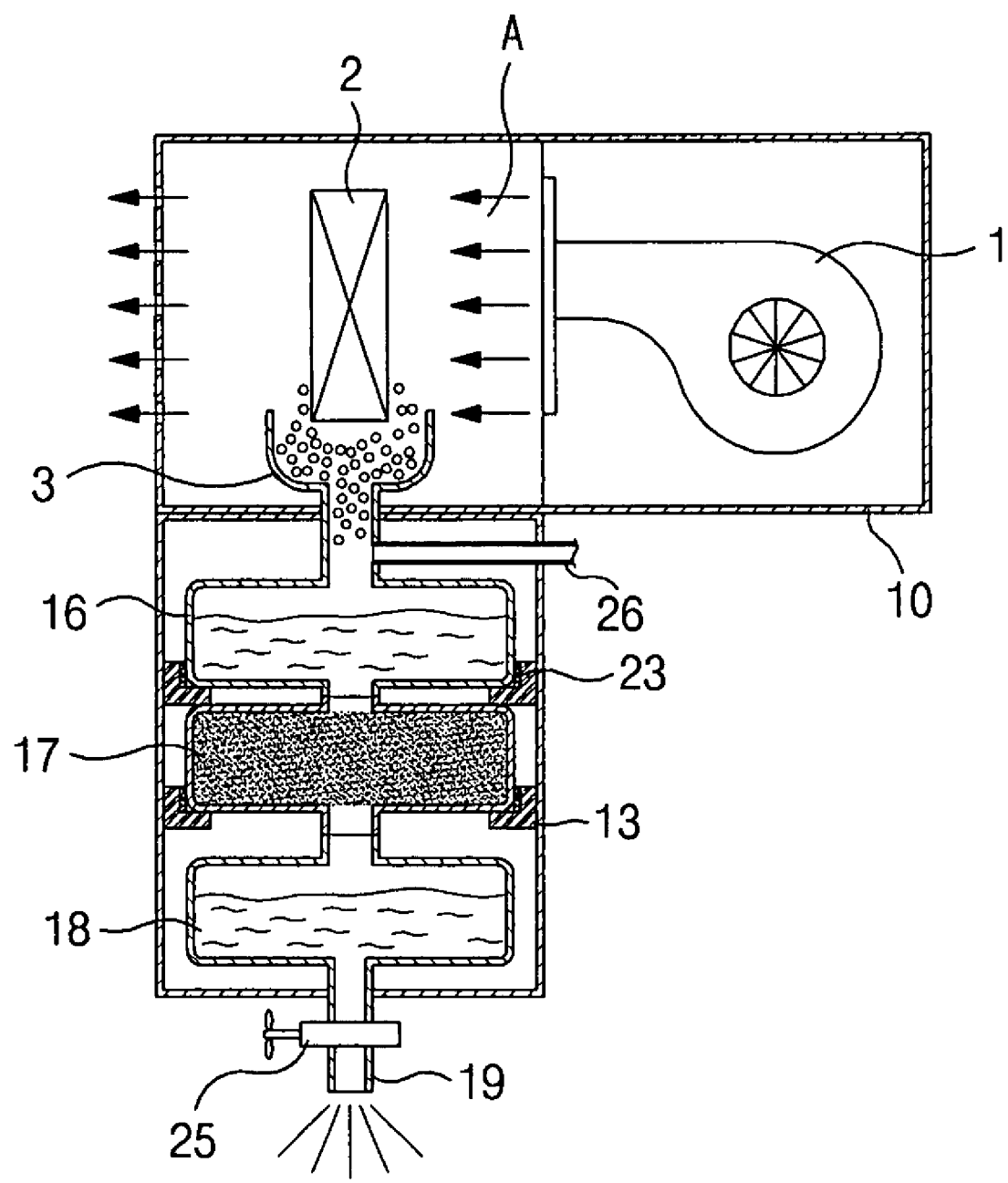
FIG. 2 is a schematic view illustrating an apparatus for collecting condensed water, which is installed at a lower side of an air conditioner evaporator of heavy construction equipment according to an embodiment of the present invention.
Figure 3:
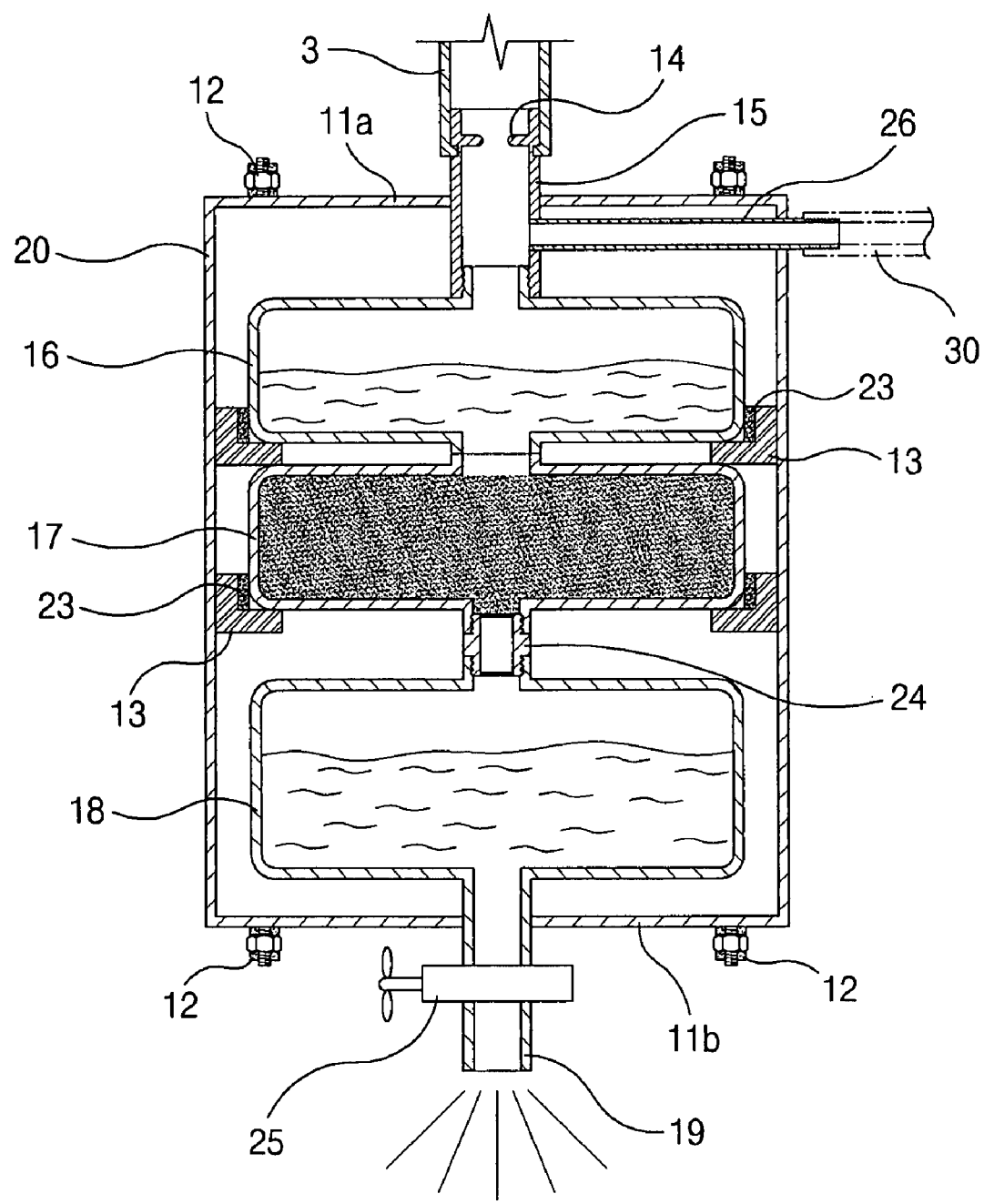
FIG. 3 is a side cross sectional view illustrating an apparatus for collecting condensed water of an air conditioner evaporator in heavy construction equipment according to an embodiment of the present invention.
Figure 4:
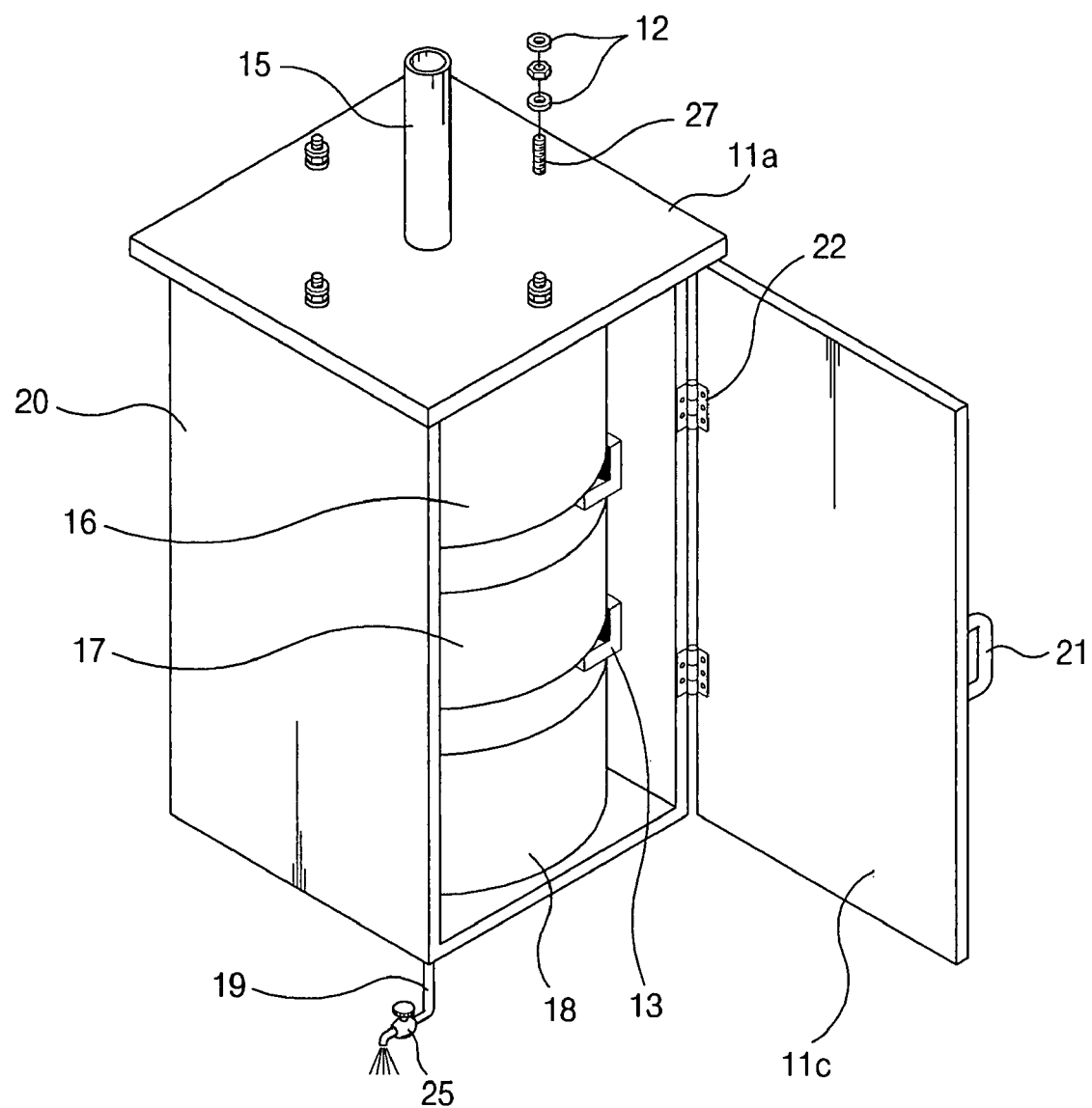
FIG. 4 is a schematic view illustrating a state that a door of an apparatus for collecting condensed water of an air conditioner evaporator in heavy construction equipment according to an embodiment of the present invention.
Figure 5:
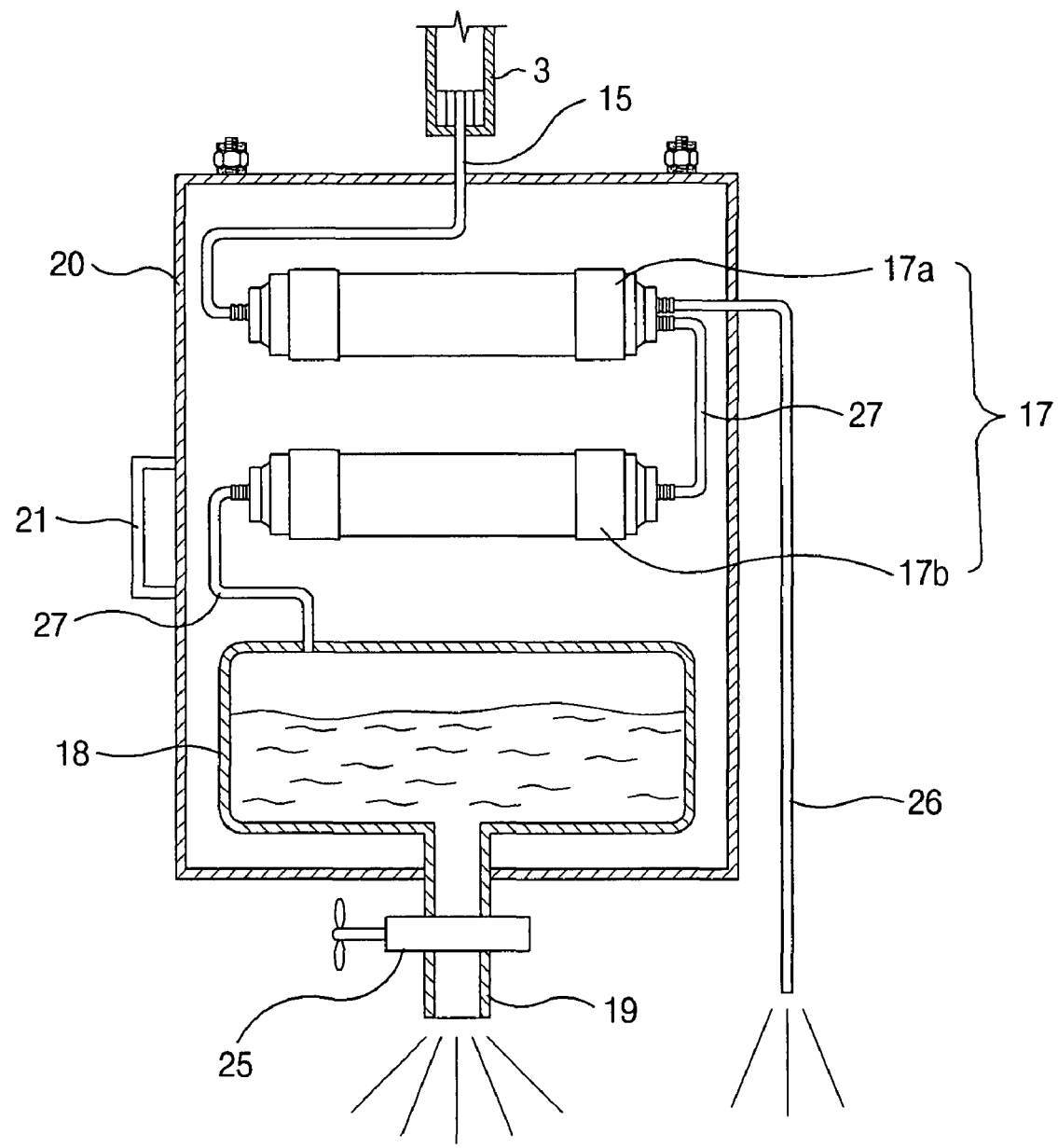
FIG. 5 is a schematic view illustrating an apparatus for collecting condensed water of an air conditioner evaporator in heavy construction equipment according to another embodiment of the present invention.

FIG. 2 is a schematic view illustrating an apparatus for collecting condensed water, which is installed at a lower side of an air conditioner evaporator of heavy construction equipment according to an embodiment of the present invention. FIG. 3 is a side cross sectional view illustrating an apparatus for collecting condensed water of an air conditioner evaporator in heavy construction equipment according to an embodiment of the present invention. FIG. 4 is a schematic view illustrating a state that a door of an apparatus for collecting condensed water of an air conditioner evaporator in heavy construction equipment according to an embodiment of the present invention. FIG. 5 is a schematic view illustrating an apparatus for collecting condensed water of an air conditioner evaporator in heavy construction equipment according to another embodiment of the present invention.

The apparatus for collecting condensed water of an air conditioner evaporator in heavy construction equipment according to the present invention may be applied to a large size truck, an excavator, a payloader, etc.

In the present invention, there is provided an apparatus for collecting condensed water of an air conditioner evaporator in heavy construction equipment which is able to receive condensed water "W" into a receiver 3 from an evaporator 2 and treats the same which comprises:

a body 20 which is installed at one side of the evaporator 2 and includes a plurality of support frames 13 provided in the interior of the same, with its upper and lower sides 11a and 11b being fixed with a vibration resistant member 12;

a water collection pipe 15 which allows the condensed water "W" produced from the evaporator 2 to be supplied to a water inlet valve 14;

a storing tank 16 which is connected with the water inlet valve 14 and stores condensed water "W" inputted via the water inlet valve 14;

a water purification filter 17 which filters dirt, heavy metallic substances and organic chemicals contained in the condensed water "W" supplied from the storing tank 16; and a water purification tank 18 which stores the filtered condensed water "W" and has a pipe extended to the outside of the body 20.

The body 20 is provided with a rotatable door 11c which opens forward based on an operation of a handle 21. A flange is formed at an inner wall of the body 20 as the support frame 13 is protruded along an inner wall surface.

A vibration resistant packing 23 is attached along a surrounding portion of the support frame 13. At least one side of the upper and lower sides of the storing tank 16 and the water purification filter 17 is fixed at the support frame 13.

As shown in FIG. 3, the vibration resistant packing 23 is mounted on the support frame 13, and the storing tank 16 and the water purification filter 17 are fixedly mounted.

The vibration resistant member 12 is made of an elastic material such as rubber and is inserted into an outer side of the bolt, and the vibration resistant packing 23 is made of a rubber material or a foamed urethane material and is fixed at the support frame 13.

In the apparatus for collecting condensed water of an air conditioner evaporator in heavy construction equipment according to the present invention, the water purification filer 17 comprises a filtering filter consisting of an activated carbon and a polypropylene agent for filtering foreign substances such as dirt contained in the condensed water "W" supplied from the storing tank 16, and an antimicrobial filter 24 consisting of a polyamide agent provided at an outlet for purifying heavy metallic substances and organic compound of condensed water inputted via the filtering filter.

The water purification filter 17 is able to filter micro particles or foreign substances with the help of pores formed in the activated carbon. More preferably, it filters micro foreign substances of above 5 microns for thereby effectively purifying condensed water.

The antimicrobial filter 24 filters organic substances such as bacteria of the condensed water filtered via the filtering filter, and heavy metallic substances contained in oil. It is basically designed to filter foreign substances below 0.0001 microns for thereby effectively purifying condensed water "W".

As shown in FIG. 5, according to another embodiment of the present invention, the water purification filter 17 is formed of a carbon filter 17a, and the antimicrobial filter 24 is formed of a membrane filter 17b, so that the condensed water collected from the evaporator 2 may be purified and changed to drinkable water.

The apparatus for collecting condensed water of an air conditioner evaporator in heavy construction equipment according to the present invention, a faucet 25 may be connected at a lower end of a pipe 19 for thereby selectively discharging the condensed water "W" filtered and stored in the water purification tank 18.

The apparatus for collecting condensed water of an air conditioner evaporator in heavy construction equipment according to the present invention may further comprises a discharge pipe 26 for discharging the condensed water "W" to the outside when the level of the condensed water exceeds a certain level in the interior of the storing tank 16.

A hose member 30 may be connected to an opening of the discharge pipe 26. So, the condensed water "W" is discharged to the outside before the condensed water passes via the water purification filter 17 when the condensed water reaches a certain level in the storing tank 16. The installation position of the discharge pipe 26 may change depending on the flowing rate of the condensed water "W" produced from the evaporator 2 and the condensed water "W" inputted into the storing tank 16.

In the apparatus for collecting condensed water of an air conditioner evaporator in heavy construction equipment according to the present invention, there may be further provided a pressure pump (not shown) at a connection pipe 27 which connects the storing tank 16 and the water purification filter 17.

Here, the pressure pump allows the condensed water "W" inputted into the storing tank 16 to discharge to the water purification filter 17 depending a previously set pressure. In this case, an internal pressure of the water purification tank 18 is considered.

In the drawings, reference numeral 22 is a hinge member, and 27 is a fixing member such as a bolt, etc. for fixing the body at one side of the heavy construction equipment.

The operation and effects of the apparatus for collecting condensed water of an air conditioner evaporator in heavy construction equipment according to the present invention will be described.

As shown in FIG. 2, an air conditioner is used during hot summer days. In this case, condensed water is produced from the evaporator 2. The body 20 is fixed at one side of the evaporator 2 as the receiver 3, a water collection pipe 15 and a water inlet valve 14 are connected.

A lot of vibration occurs during an operation and work of the heavy construction equipment. The above vibrations applied to the body 20 are absorbed by disposing the vibration resistant member 12 at the upper and lower sides 11a and 11b of the body 20.

In addition, the above vibrations applied to the water purification filter 17 are absorbed by the vibration resistant packing 23 disposed between the water purification filter 17 and the inner wall of the body 20. The vibrations applied to the storing tank 16 are also absorbed.

The vibrations are generally absorbed by means of the elastic forces of the vibration resistant member 12 and the vibration resistant packing 23, so that the stability of the assembled elements such as the water purification filter 17 and the storing tank 16 is enhanced, and the durability of the product is enhanced as well.

In case that a certain work place has a lot of vibrations or the vibrations occur for a long time period, it is needed to dispose the vibration resistant member 12 in a dual structure. An elastic spring may be provided between the fixing members 27 such as bolts for thereby enhancing a vibration absorbing operation.

In the present invention, the condensed water is inputted into the storing tank 16 via the water collection pipe 15 and the water inlet valve 14. The condensed water is collected into the water purification tank 18 in a state that dirt or organic compounds are removed via the water purification filter 17 or the antimicrobial filter 24.

Here, the condensed water "W" may pass through the filters 17 and 24 with pressures previously set by the compression pump. A user may open a faucet 25 for thereby using the condensed water for washing or drinking.

When the level of the condensed water "W" exceeds a certain level in the interior of the storing tank 16, the condensed water flows into the discharge pipe 26 and is discharged to the outside of the equipment via the hose 30.

When a maintenance is needed, the door 11c is opened forward by pulling the handle 21, and the filters 17 and 24 or the tanks 16 and 18 may be easily separated from the support frame 13 and may be exchanged. Namely, a maintenance work is easy with the helps of detachable structures.

When the water purification filter 17 and the antimicrobial filter 24 are formed of the carbon filter 17a and the membrane filter 17b according to another embodiment of the present invention, dirt or other pollutant may be removed from the condensed water "W" at the construction site, it is possible to use the condensed water for washing or drinking.

In another preferred embodiment of the present invention, the filtering filter and the antimicrobial filter may be manufactured in a module type and may be disposed in the water purification filter in multiple layers. In this case, a foamed member may be further provided in the interior of the body depending on a lot of vibrations of the heavy construction equipment in addition to the vibration resistant packing.

As described above, according to the apparatus for collecting condensed water of an air conditioner evaporator in heavy construction equipment, the condensed water produced from an air conditioner evaporator may be collected and treated and may be used by removing dirt or foreign substances using a water purification filter for washing or drinking in an outdoor work place where there is not a water supply facility. Even when a lot of vibrations is applied to the body and the water purification filter, the vibration resistant member effectively absorbs the above vibrations, so that the durability of the product is significantly enhanced.

As the present invention may be embodied in several forms without is departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An apparatus for collecting condensed water of an air conditioner evaporator in heavy construction equipment which is able to receive condensed water into a receiver from said evaporator and treat the same, comprising:
   a body which is installed at one side of said evaporator and includes a plurality of support frames provided in an interior of the body, with upper and lower sides of the body being fixed with a vibration resistant member;
   a water inlet valve;
   a water collection pipe which allows the condensed water produced from the evaporator to be supplied to the water inlet valve;
   a storing tank which is connected with the water inlet valve via said water collection pipe and which stores condensed water inputted via the water inlet valve;
   a water purification filter which filters dirt, heavy metallic substances, and organic chemicals contained in the condensed water supplied from the storing tank; and
   a water purification tank which stores the filtered condensed water and has an outside pipe extended to an outside of the body,
   wherein said water purification filter comprises:
   a filtering filter which filters foreign substances contained in condensed water from the storing tank and consists of activated carbon and polypropylene agent, and
   an antimicrobial filter which filters heavy metallic substances and organic compound contained in the condensed water inputted via the filtering filter and is formed of a polyamide agent,
   and wherein said apparatus further comprises:
   a discharge pipe connected to said water collection pipe at a point between the valve and the storing tank which discharges the condensed water to an outside of the storing tank when the condensed water stored in the storing tank reaches a certain level.

2. The apparatus of claim 1, wherein said body comprises a door which rotates and opens in a forward direction based on an operation of a handle, and said water purification filter is engaged at a surrounding portion of a support frame of the body with a vibration resistant packing.

3. The apparatus of claim 1, wherein a faucet is provided at one end of the outside pipe for selectively discharging the filtered condensed water stored in the storing tank.

4. The apparatus of claim 1, wherein the vibration resistant member is made of elastic material.

* * * * *